United States Patent [19]

Waters, Jr.

[11] Patent Number: 5,795,435
[45] Date of Patent: Aug. 18, 1998

[54] TRANSFER TAPE APPLICATOR SYSTEM

[76] Inventor: Jesse Walter Waters, Jr., P.O. Box 384, Springfield, Ga. 31329

[21] Appl. No.: 555,045

[22] Filed: Nov. 8, 1995

[51] Int. Cl.$^6$ .................................................. B65H 23/26
[52] U.S. Cl. .......................... 156/577; 156/540; 156/576; 156/579
[58] Field of Search ......................... 156/577, 578, 156/579, 574, 543, 540, 538, 523, 576

[56] References Cited

U.S. PATENT DOCUMENTS

| | | | |
|---|---|---|---|
| 3,522,132 | 7/1970 | Cardis | 156/577 X |
| 3,738,888 | 6/1973 | Williams | 156/238 |
| 3,907,628 | 9/1975 | Buske | 156/574 |
| 4,274,904 | 6/1981 | Harrison et al. | 156/461 |
| 4,288,275 | 10/1981 | Davis | 156/367 |
| 4,849,064 | 7/1989 | Manusch et al. | 456/577 |
| 4,891,090 | 1/1990 | Lorincz et al. | 156/577 |
| 4,996,941 | 3/1991 | Mills | 156/578 X |
| 5,006,184 | 4/1991 | Manusch et al. | 156/577 |
| 5,013,336 | 5/1991 | Myers et al. | 156/351 |
| 5,061,947 | 10/1991 | Morrison et al. | 156/577 X |
| 5,114,520 | 5/1992 | Wang, Jr. et al. | 156/240 |
| 5,281,290 | 1/1994 | Bosler | 156/230 |
| 5,312,501 | 5/1994 | Gruber et al. | 156/238 |

FOREIGN PATENT DOCUMENTS

| | | |
|---|---|---|
| 592548 | 9/1947 | United Kingdom . |
| 2 078 173 | 1/1982 | United Kingdom . |
| 2 114 951 | 9/1983 | United Kingdom . |

OTHER PUBLICATIONS

SignCraft Magazine, p. 149, Webermade advertisement for tape applicator with adjustable clutch, No. 238.
Table Top Tape Applicator, Denver Sign Supply Co., Inc. advertisement, No. 138.
SignCraft Magazine, p. 99, Trans–a–liner advertisement for transfer tape application tool.
SignCraft Magazine, pp. 74–76, "Making vinyl application easier".

*Primary Examiner*—Francis J. Lorin
*Attorney, Agent, or Firm*—Richard C. Litman

[57] ABSTRACT

An applicator for use in conjunction with the top of a work surface, designed for multiple applications enabling a user to either separate an adhesive sheet material from its release paper for application to a substrate or apply transfer tape to a work copy. The invention is made up of a frame, two tension rods immovably affixed between to spaced-apart side members of the frame, and a support axle operably attached to said frame so as to enable said support axle to rotate. The frame is made up of two generally vertically spaced-apart side members affixed to a generally horizontal platform. Each of the side members are generally identically dimensioned, and define a slot at the top edge adapted to accept one end of the support axle whereby the support axle is free to be rotated. The support axle is adapted to frictionally hold a standard roll of commonly available transfer tape or vinyl sheet material. An additional support rod adapted to hold a roll of sheet material is located to the rear of the device, whereby an exceedingly long vinyl substrate or copy can be stored until ready for use, and subsequently, unrolled onto the work surface. A clasping device may be used in combination with the applicator as a means by which a bubble-free, smooth adhesion of a sheet material to a planar surface may achieved, minimizing undesired contact between the adhesive surface of the transfer sheet material and a contact surface.

4 Claims, 3 Drawing Sheets

TRANSFER TAPE APPLICATOR SYSTEM

BACKGROUND OF THE INVENTION

1. Field of the Invention

The present invention relates to an transfer tape application device for use in conjunction with the top of a work surface. The invention is designed for multiple applications, including enabling a user to separate an adhesive sheet material from its release paper for application to a substrate or application of transfer tape to a substrate.

2. Description of the Prior Art

The use of adhesive vinyl sheet material and transfer tape for masking and creating signs in a sign shop is well known in the prior art. Typically, the process of creating a sign displaying adhesive vinyl graphics requires that a sign maker first die-cut the desired graphic design, often using a computer controlled cutting apparatus, from an adhesive sheet stock, such as vinyl, having a release paper. The graphics are then "weeded", removing the undesired areas of vinyl from the release paper, leaving only the desired graphic design on the release paper. Thus, a final weeded copy is created. However, the graphics must still be transferred undisturbed to a substrate for completion of the sign. This transfer is normally accomplished using a transparent, releasable-adhesive transfer tape.

Transfer tape is commercially available in various widths and lengths, wrapped into a roll on a standard 3 inch inner-diameter tube. When unrolled in a clockwise direction, the upper surface of the transfer tape is non-adhesive; the lower surface is adhesive. To prepare a sign, the adhesive surface may be brought into firm contact with the vinyl graphics. This assembly allows the release paper to be removed without disturbing the graphics, leaving them adhered to the transfer tape. The graphics are then ready for application to the substrate.

Other applications may require application of a vinyl sheet material directly to a substrate without cutting of graphics from the vinyl sheet material. For example, changing the base color of the substrate may be achieved by coating the substrate with a sheet of the desired color vinyl. The desired result for this type application is a wrinkle-free and bubble-free surface. However, a major impediment to this result is the removal of the release paper so that the adhesive surface can be properly positioned. Moreover, the adhesive feature of the transfer tape and vinyl requires that the adhesive side avoid any contact with the graphics or other surface until properly positioned. Undesired contact risks disturbing or blemishing the appearance of the graphic design. These problems also exist in applications in which a release paper must be removed from an assembly of weeded copy and transfer tape.

Despite these difficulties, heretofore, various attempts to aid the manual application of transfer tape to another substrate have only been directed at simply supporting the transfer tape during the positioning or application of the film. On the other end of the spectrum, complex automated machinery has been developed which are adapted in structure to transfer various coatings onto substrates which use transfer sheets, but which fail to address the problems associated with manually performed transfer tape applications.

For example, U.S. Pat. No. 5,312,501 issued May 17, 1994 to Gruber et al. describes a process using a motorized and complex series of rollers which makes up an automatic transfer tape application device. U.S. Pat. No. 5,281,290 issued Jan. 25, 1994 to Bosler describes a method and apparatus for forming a coated substrate by transferring a textured pattern, having been applied by rotary screening to a transfer sheet, to a heated, extruded substrate. U.S. Pat. No. 4,288,275 issued Sep. 8, 1981 to Davis describes a complex coating apparatus for a hot leaf stamping process whereby a transfer design on a roll of foil is brought into contact with a product to be coated in the presence of sufficient heat and pressure to assure transfer. U.S. Pat. No. 5,114,520 issued May 19, 1992 to Wang, Jr., et al. also describes a method and apparatus for transfer of images from a donor surface to a receptor utilizing heated pressure rolls to cause the transfer of the images. British Patent Specification 592,548 accepted Sep. 22, 1947 describes a process to transfer a thermoplastic ink print by heat and pressure to a substrate. UK Patent Application 2,078,173 published Jan. 6, 1982 describes a method of making color patterns using a printing ink applied to one side of a continuously moving fabric. U.S. Pat. No. 3,738,888 issued Jun. 12, 1973 to Williams describes a process for discrete element transfer from a continuous flexible and adhesive tape to a discrete substrate, primarily used in the processing of semi-conductors.

Various manually operated devices are also found in the prior art which are adapted for use with transfer sheets of various types, but none addresses the previously noted problems or are adapted to perform the desired functions needed to create signs. U.S. Pat. No. 5,013,386 issued May 7, 1991 to Myers et al. describes a manually operated apparatus for applying a thin material such as roll leaf from a roll onto a flat surface. The user manually advances a roller over the flat surface by using a pair of handles on the sides of the device in order to position the device for application of the roll leaf. U.S. Pat. No. 4,849,064 issued Jul. 18, 1989 to Manusch et al. describes a hand-operated device for transferring a transferable adhesive film used on form documents for adhering multiple sheets of paper, whereby the adhesive is transferred from a carrier tape onto a substrate. The carrier tape is loaded into the housing onto a feed reel; the spent tape is taken up by a wind-up reel. UK Patent Application 2,114,951 published Sep. 1, 1983 describes a hand-size and hand-held applicator for transferring an adhesive tape to an article which automatically removes a spacer tape. U.S. Pat. No. 4,274,904 issued Jun. 23, 1981 to Harrison et al. describes a tape dispenser and applicator assembly for wrapping a foil tape onto the edges of glass.

None of the above inventions and patents, taken either singly or in combination, is seen to describe the instant invention as claimed.

SUMMARY OF THE INVENTION

The present invention relates to an transfer tape application device for use in conjunction with the top of a work surface. The invention is designed for multiple applications, including enabling a user to separate an adhesive sheet material from its release paper for application to a substrate or application of transfer tape to a substrate.

The preferred embodiment of the invention is made up of a frame, two tension rods immovably affixed between to spaced-apart side members of the frame, and a support axle operably attached to said frame so as to enable said support axle to rotate. The frame is made up of two generally vertical spaced-apart side members and a generally horizontal platform, the side members being affixed to opposite edges of said platform, whereby a generally U-shaped assembly is formed. Each of the side members, having a front edge, a rear edge, and a bottom edge, are generally identically dimensioned and configured, and define a slot at the upper portion of the rear edge adapted to accept one end of the support axle. The slot is dimensioned to allow the support axle to be closely seated while simultaneously permitting the support axle to be rotated. The support axle is adapted to engagingly hold a standard 3" roll of commonly available transfer tape or vinyl sheet material. An additional support rod adapted to engage a roll of sheet material is located to the rear of the device whereby an exceedingly long vinyl substrate or copy (onto which the transfer tape held on the support axle is to be applied) can be stored until ready for use, and subsequently, unrolled onto the work surface.

Each of the two tension rods are positioned parallel to one another between the side members so that the two tension rods are slopingly affixed to the side members. This creates a pair of tension rods that are generally diagonally offset, similar in configuration to a gymnast's uneven parallel bars.

In use, the applicator is placed upon a flat work surface. Any copy or substrate to be placed onto the support rod may be first set in place and unrolled onto the work surface, the sheet material being fed below both tension rods so as to lay flat upon the work surface and the platform. The support axle is then removed from the frame and a roll of sheet material is inserted onto the support axle. The support axle is then reset upon the frame so that the roll is able to rotate clockwise, resulting in the adhesive side of the sheet material being dispensed facing towards the work surface. The sheet material is then fed under the upper tension rod and over the lower tension rod. If the sheet material is backed by a release paper, at this point the release paper is peeled away from the sheet material and fed to the rear of the applicator. As the sheet material is pulled forward, the release paper must be manually pulled in the opposite direction to remove it.

A clasping device may be used in combination with the applicator as a means by which a bubble-free, smooth adhesion of a sheet material to a planar surface may be achieved, minimizing undesired contact between the adhesive surface of the transfer sheet material and a contact surface. The clasping device is an elongated top member hinged to a mating elongated bottom member, having a first surface and second surface matingly adapted to accept and apply a gripping jaw-like action onto the end of a transfer sheet material. The jaws allow a user to apply an even manual pressure to the width of the sheet material, thereby allowing the user to apply an even pull on the roll. The bottom surface of the bottom member is flat to stably rest upon a work surface.

When the sheet material is unrolled to a desired length, the clasping device may be set down to rest upon the work surface so as to maintain tension on the transfer tape and to free the user's hands. The clasping device suspends the transfer tape above the work surface between the first tension rod and the clasping device, whereby the adhesive side of the transfer tape avoids contact with the copy or work surface. Once the clasping device and transfer tape are properly positioned, the user is free to continue in the preparation of the sign.

Accordingly, it is a principal object of the invention to provide an applicator for application of adhesive sheet material for use in conjunction with the top of a work surface. The invention is designed for multiple applications enabling a user to either separate an adhesive sheet material from its release paper for application to a substrate or application of transfer tape to a weeded copy.

It is another object of the invention to provide an applicator designed for multiple applications enabling a user to either separate an adhesive sheet material from its release paper for application to a substrate or application of transfer tape to a work copy.

It is a further object of the invention to provide a clasping device for manual use in combination with the applicator which suspends the sheet material above the work surface.

Still another object of the invention is to provide an application device that stores an excess amount of work copy or other sheet material substrate in immediately useable relation to the sheet material to be applied thereto.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention relates to an transfer tape application device for use in conjunction with the top of a work surface. The invention is designed for multiple applications, including enabling a user to separate an adhesive sheet material from its release paper for application to a substrate or application of transfer tape to a substrate.

Figure 1:
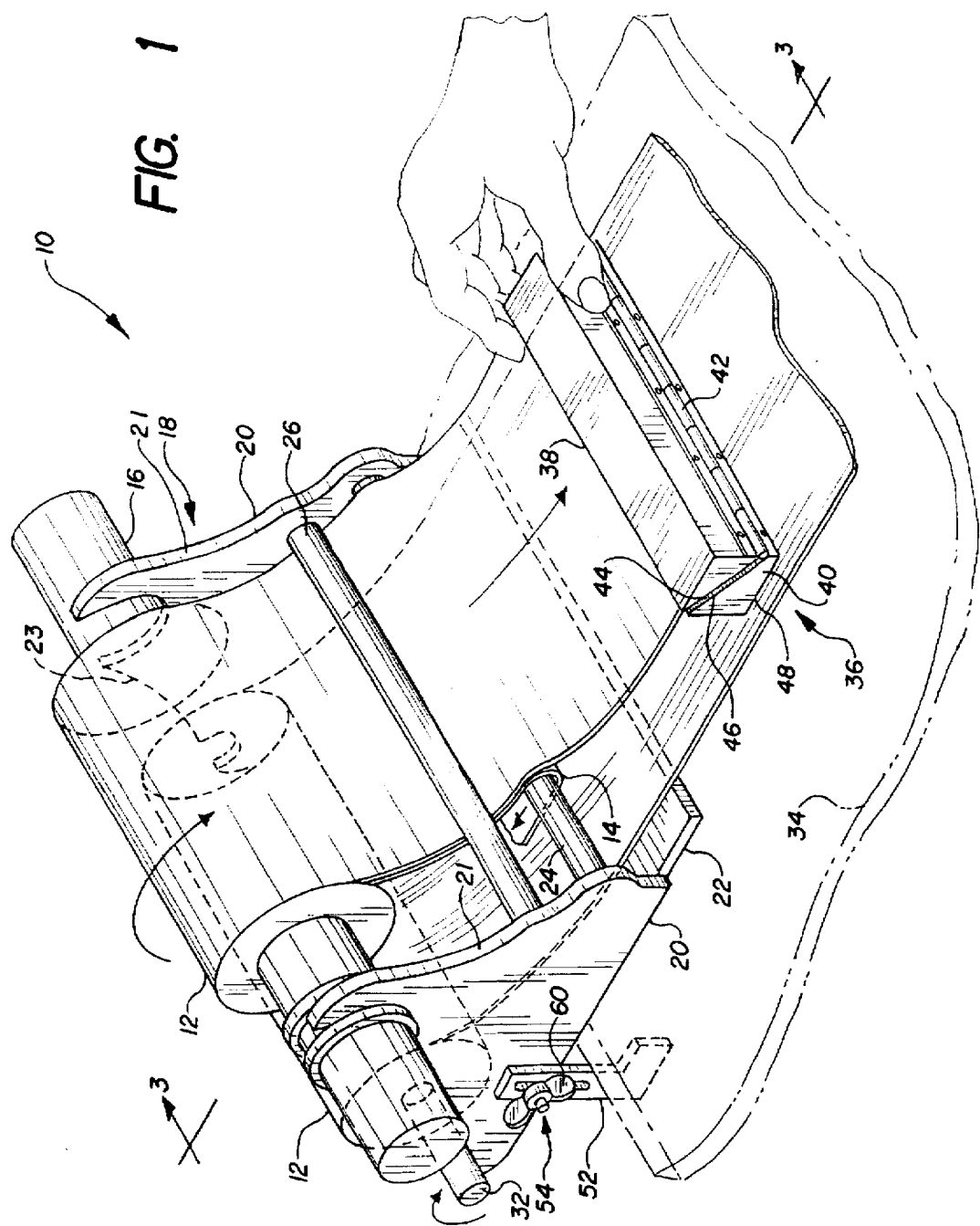
FIG. 1 is an environmental view of the applicator and clasping device in use and attached to a work surface.

Referring to FIG. 1, the preferred embodiment of the applicator 10 is shown loaded with a roll of sheet material 12 backed by release paper 14 onto a support axle 16. The support axle 16 is rotatably mounted on a frame 18, which frame is made up of two general vertically spaced-apart side members 20 and a generally horizontal platform 22. The side members 20 are affixed to the opposite edges of said platform 22, whereby a generally U-shaped assembly is formed. A first tension rod 24 and a second tension rod 26 are immovably affixed in an uneven parallel relationship between the side members 20, whereby the tension rods are generally diagonally offset, similar in configuration to a gymnast's uneven parallel bars. The structural components of the applicator are preferably made from PVC plastic, however other suitable materials may be used.

Figure 2:
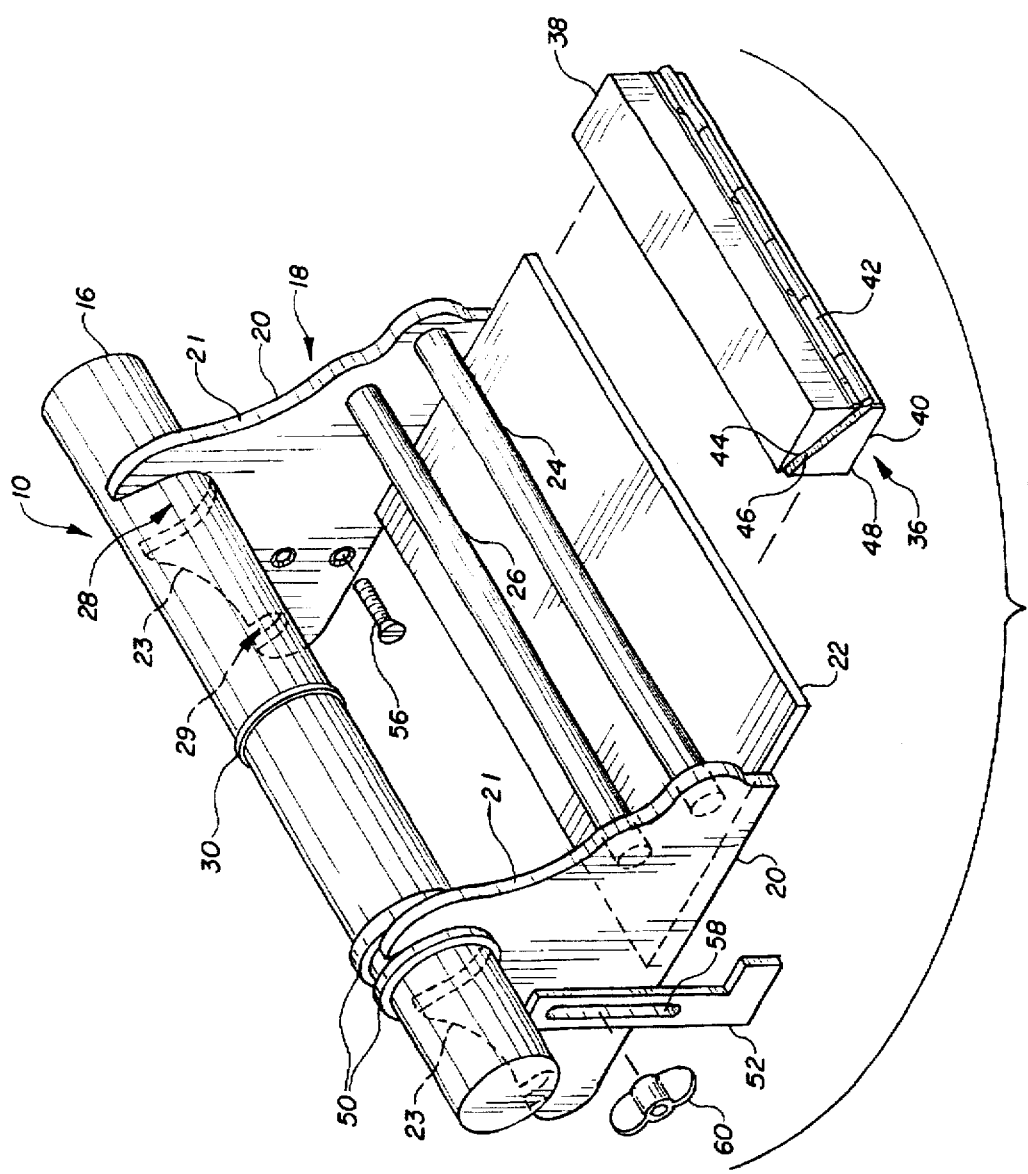
FIG. 2 is an isometric view of the applicator and clasping device.

As can be best appreciated from FIG. 2, each of the side members 20 includes a front edge 21 and a rear edge 23 having an upper slot 28 adapted to accept one end of the support axle 16 and a lower recess 29 adapted to accept one end of support rod 32. The slot 28 is dimensioned to allow the support axle 16 to be closely seated while nevertheless allowing support axle to be rotated. The diameter of the support axle 16 is dimensioned to frictionally engage the inside diameter of a standard 3" roll of commonly available transfer tape or vinyl sheet material. The roll of sheet material (not shown in FIG. 2 for purpose of clarity) may be secured onto the support axle 16 by a removable retaining ring 30, which is tightly affixed against the edge of the roll and to the circumference of the support axle 16. The ring may be a rubber O-ring or other suitable material.

As can be appreciated from both FIG. 1 and FIG. 3, a support rod 32 removably secured in lower recess 29 is also adapted to hold a second roll of sheet material 12, whereby an exceedingly long vinyl substrate or copy (onto which the transfer tape held on the support axle is to be applied) can be stored until ready for use, and subsequently, unrolled onto the work surface 34.

The assembly of component parts heretofore described are secured to the work surface 34 by an L-bracket 52, which bracket's height is adjustable relative to the work surface. The L-bracket is designed to overhang the edge of a work surface, whereby the lower arm of the L-bracket extends below the lip of a work surface. After bringing the L-bracket into tight alignment with the edge and lip of a work surface, a tensioning mechanism 54 is provided to allow the L-bracket to be tightened to the work surface 34 and the side members 20. As shown in FIG. 1 and FIG. 2, a threaded bolt 56, secured to a side member 20, inserted through a slot 58 in the bracket 52, and secured by a wing nut 60, may be used as a tensioning mechanism 54.

A clasping device 36 may be used in combination with the applicator 10. The clasping device 36 is an elongated top member 38 operably attached to a mating elongated bottom member 40 by a hinge 42. A first surface 44 and second surface 46 are matingly adapted to form jaws which may grip onto the end of a transfer sheet material 12. The so-formed jaws allow a user to apply a manual, even pressure to the width of the sheet material, thereby allowing the user to apply an even pull on the roll, aiding the elimination of wrinkles in the sheet material. The bottom surface 48 of the bottom member 40 is flat to stably rest upon a work surface 34 when the clasping device 36 is not in use.

As can be best appreciated from FIG. 2, lateral movement of the support axle 16 on the frame is prevented by a pair of fixed retaining rings 50. Each of these rings 50 are affixed around the circumference of the support axle 16 in a parallel and close proximity to one another, thereby defining a gap of predetermined width. This gap is determined by the thickness of a side member 20, the side member having an inner and outer surface, whereby the inner and outer surface is bounded by the retaining rings. The side member 20 thus supports the support axle 16 within this gap.

Figure 3:
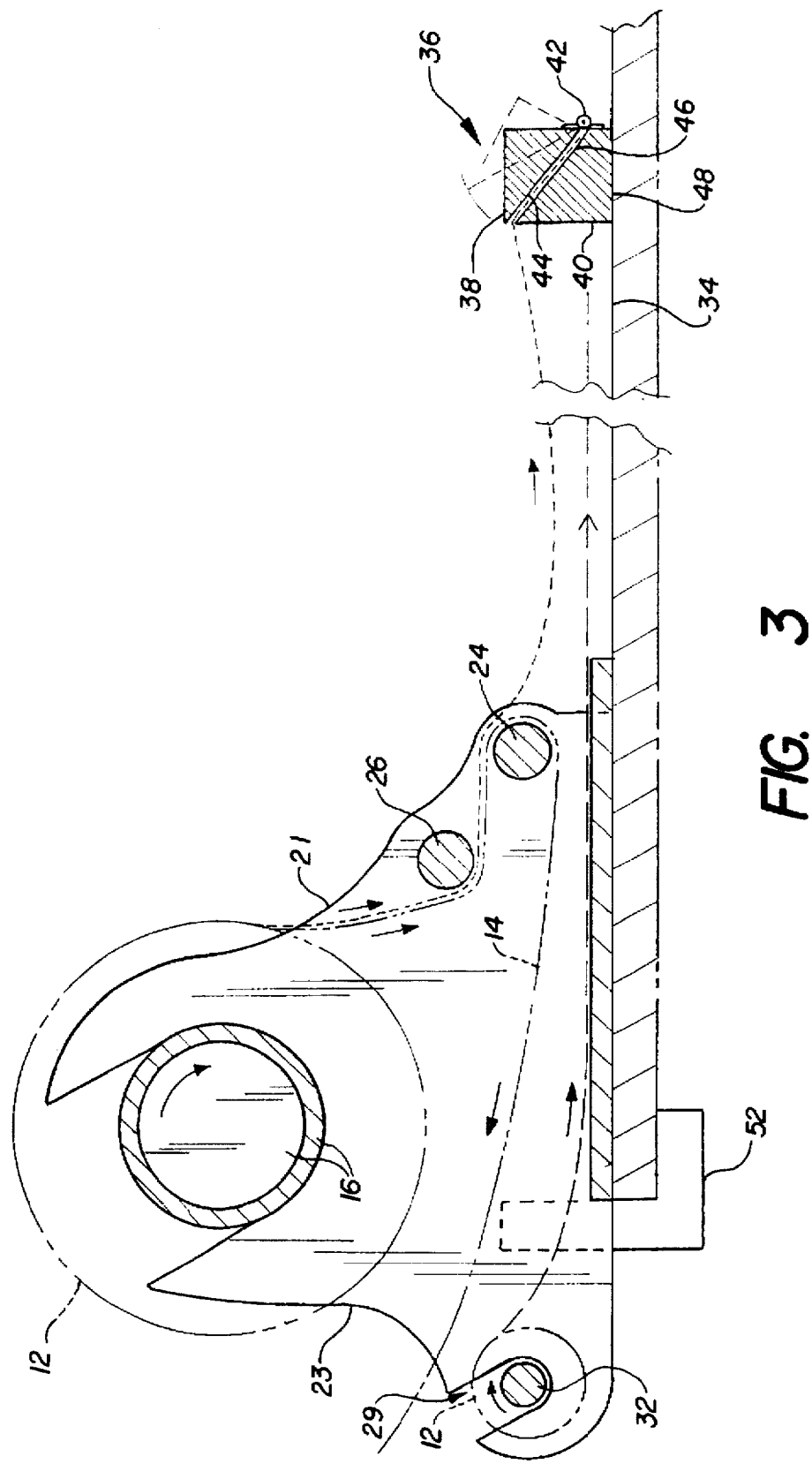
FIG. 3 is a cross sectional view of the transfer tape application device along line 3—3 of FIG. 1.

Referring now to FIG. 3, the applicator 10 is shown at a point in time when rolls of sheet material 12 have been loaded onto the applicator 10, the applicator having been attached to a flat work surface by the bracket 52 and tensioning mechanism (not shown). A copy or substrate sheet material 12 having been properly placed onto the support rod 32 is shown unrolled (the clockwise arrow showing the direction of movement during the unrolling operation) and fed below both tension rods so as to lay flat upon the work surface 34 and the platform 22. The support axle 16 is also loaded with a roll of sheet material 12 (which also rotates in the clockwise direction when unrolled). The sheet material 12 must be fed under the second tension rod 26 and over the first tension rod 24. The sheet material 12 is shown backed by a release paper 14 peeled away from the sheet material and fed to the rear of the applicator under the second tension rod 26.

When the sheet material 12 is unrolled to a desired length, the clasping device 36 may be set down to rest upon the work surface 34 so as to maintain tension on the sheet material 12 and to free a user's hands. The clasping device 36 suspends the transfer tape above the work surface 34 between the first tension rod 24 and the clasping device 36, whereby the adhesive side of the sheet material avoids contact with the copy or work surface. Once the clasping device and transfer tape are properly positioned, the user is free to continue in the preparation of the sign.

It is to be understood that the present invention is not limited to the embodiment described above, but encompasses any and all embodiments within the scope of the following claims.

I claim:

1. A transfer tape applicator for supporting and dispensing a roll of sheet material over a work surface comprising:

a frame including a rectangular platform and two vertically extending side members affixed to opposite edges of said platform;

each of said side members including a front edge and a rear edge having an upper slot and a lower recess;

a removable support axle rotatably disposed in each said upper slot for supporting a first roll of sheet material;

a removable support rod rotatably disposed in each said lower recess for supporting a second roll of sheet material;

an upper tension rod and a lower tension rod slopingly affixed between said side members for tensioning the first roll sheet material above a work surface; and clamping means for removably securing said frame to the work surface.

2. The transfer tape applicator according to claim 1, said clamping means including an L-shaped bracket slidably coupled to each said side members.

3. The transfer tape applicator according to claim 1, said removable support axle includes fixed retaining rings for preventing lateral movement.

4. The transfer tape applicator according to claim 1, further including a clasping device for pulling the first roll of sheet material uniformly above the work surface, said clasping device comprising:

an elongated bottom member having an inclined top surface and a flat bottom surface for stably resting on the work surface;

an elongated top member having an inclined bottom surface for matingly engaging said top surface;

hinging means operably connecting said top member and said bottom member, whereby an end of the first roll of sheet material is grasped between said inclined top surface and said inclined bottom surface.

* * * * *